United States Patent [19]

Kresa, Jr.

[11] Patent Number: 5,240,342
[45] Date of Patent: Aug. 31, 1993

[54] VARIABLE ANGLE JOIST SUPPORT

[76] Inventor: Walter Kresa, Jr., 23 Willow Dr., Whitesboro, N.Y. 13492

[21] Appl. No.: 771,736

[22] Filed: Oct. 4, 1991

[51] Int. Cl.[5] .............................................. F16B 1/00
[52] U.S. Cl. ................................ 403/232.1; 52/702; 403/403; 248/300
[58] Field of Search ............ 248/300, 219.2; 52/298, 52/712, 713, 704, 702; 403/403, 382, 205, 404, 232.1

[56] References Cited

U.S. PATENT DOCUMENTS

| | | | |
|---|---|---|---|
| 631,352 | 8/1899 | Wilding | 403/403 X |
| 3,225,394 | 12/1965 | Tillisch et al. | 52/712 X |
| 3,256,030 | 6/1966 | Banse | 52/712 X |
| 3,925,954 | 12/1975 | Snow et al. | 403/403 X |
| 4,148,164 | 4/1979 | Humphrey | 52/712 X |
| 4,560,301 | 12/1985 | Gilb | 403/403 X |
| 4,669,235 | 6/1987 | Reinen | 403/403 X |
| 5,004,369 | 4/1991 | Young | 403/403 X |
| 5,016,873 | 5/1991 | Bossa | 403/403 X |

Primary Examiner—Blair M. Johnson
Attorney, Agent, or Firm—Heslin & Rothenberg

[57] ABSTRACT

A variable angle joist support includes a base plate mounted to a first surface of a supporting beam and a pair of spaced apart support sides flexibly attached to the base plate. The support sides sandwich a joist to be supported at a variable interface angle relative to said beam. Each support side includes a support section which is positionable to fit flush against respective side surface of the joist. The flexible attachment of the support sides to the base plate allows the support sides to pivot about a beam mounted base plate in order to receive a joist at any desired interface angle. The support sides can be flexibly attached to the base plate using hinges or malleable accordion shaped sections. The support sides can be provided with coplanar bottom flanges for support of and interconnection to a bottom surface of the joist. The support sides may be made of a malleable material or include multiple hinged support sections.

11 Claims, 6 Drawing Sheets

VARIABLE ANGLE JOIST SUPPORT

FIELD OF THE INVENTION

The invention described herein relates to a support system for wooden decks or structures which contain beams and joists as part of there support structure. Specifically, it relates to a flexible type of bracket or joint piece which allows one to vary the angle of attachment of a joist to a beam so that the angle of attachment can normally vary from 90 to 30 degrees.

BACKGROUND OF THE INVENTION

The building of wooden decks as an addition to one's house has become very popular. The patterns and designs such decks can be built in are varied. However in varying the designs from a strictly rectangular one, the primary problem one runs into is joining the beams and joist which form the support system in other than 90 degree angle joints. A standard joist support now in use is depicted in FIG. 1 which shows beam 8 to which a joist support 9 is attached and into which a joist 7 has been placed. The angle joining them or, in other words, the angle of interface is 90 degrees.

In the past, there have been no flexible joint elements to join or interface the joist and beams together at a variable angle. In order to make such a joint which formed an angle of other than 90 degrees between a joist and a beam one had to specially cut the end of the joist to the proper angle so that it fit flush against the supporting beam. Then holes had to be drilled through both the joist and the beam and bolts inserted to connect the two. As an alternative, the two were nailed but such connections with nails were not as strong. Additionally in cutting the edge of one end of the joist to the proper angle to make it fit properly between the two supporting beams great care had to be taken. Often the angle was not cut properly and the fit between the joist and the beam was uneven.

SUMMARY OF INVENTION

The present invention, the variable angle hanger, addresses and solves the problems cited above. The present invention provides a joint piece that allows one to vary the angle between a beam and joist without the need of having to make precise angular cuts. This results in substantial savings of time as well as cost in construction.

The variable angle hanger can also be described as a variable angle joist support.

The overall idea is to provide a base plate which is attachable to a beam and attached to the base plate are two support sides which are flexibly attached to the base plate so they can easily be pivoted to the desired angle, The means for attaching the support sides can be hinges or other means to that each support side can be pivoted back and forth at an angle of 90 degrees to a few degrees between the base plate and each support side. Both support sides are pivotally attached along parallel inner edges and are separated by the average width of a standard size joist.

In one version of the flexible angle hanger, the support sides, which are hingedly attached to the base plate, are each made up of just a single piece of malleable material which is also resilient. The joist is placed between two support sides and in attaching the support sides to the joist they are bent to conform to the surface of the opposite sides of the joist. Attaching devices such as nails can be inserted through the support sides into the joist to securely attach them to the joist.

A second means of providing for the flush fitting of the support sides to the opposite sides of the joist is to have each support side made up of two or more hinged sections sequentially attached to each other so that the first section of each support side is hingedly attached to the base plate, the second is hingedly attached to the first, the third support section is hingedly attached to the second and so on. Then the first section of the support side that is hingedly attached to the base plate can be set at the angle at which the joist will meet the beam and the additional sections which are hingedly attached in sequence to the first support section, the second and so on can be pivoted to fit flush against the side of the joist.

A third means is to attach each support side to the base plate by means of an accordion shaped crimped structure with multiple folds which can be compressed and bent in different ways to vary the angle of each support side. With this type of structure you can also vary the distance between the support sides while at the same time keeping the faces of the support sides parallel to each other. The accordion or multiple folded section would be generally of a malleable or ductile metal or similar material which would have enough flexibility or pliableness in it to allow one to maneuver the two support sides so they can be attached to the opposite faces of a joist. The multiple folded or malleable accordion section would retain enough rigidity and strength so it would provide the necessary structural support.

Additionally, to the bottom of the support sides, flanges can be added that project towards the opposite support side so that when a joist is placed between the two support sides and the support sides are brought into contact with the sides of the joist the flanges on the bottom provide additional vertical support to the joist.

DESCRIPTION OF THE PREFERRED EMBODIMENT

Figure 1:
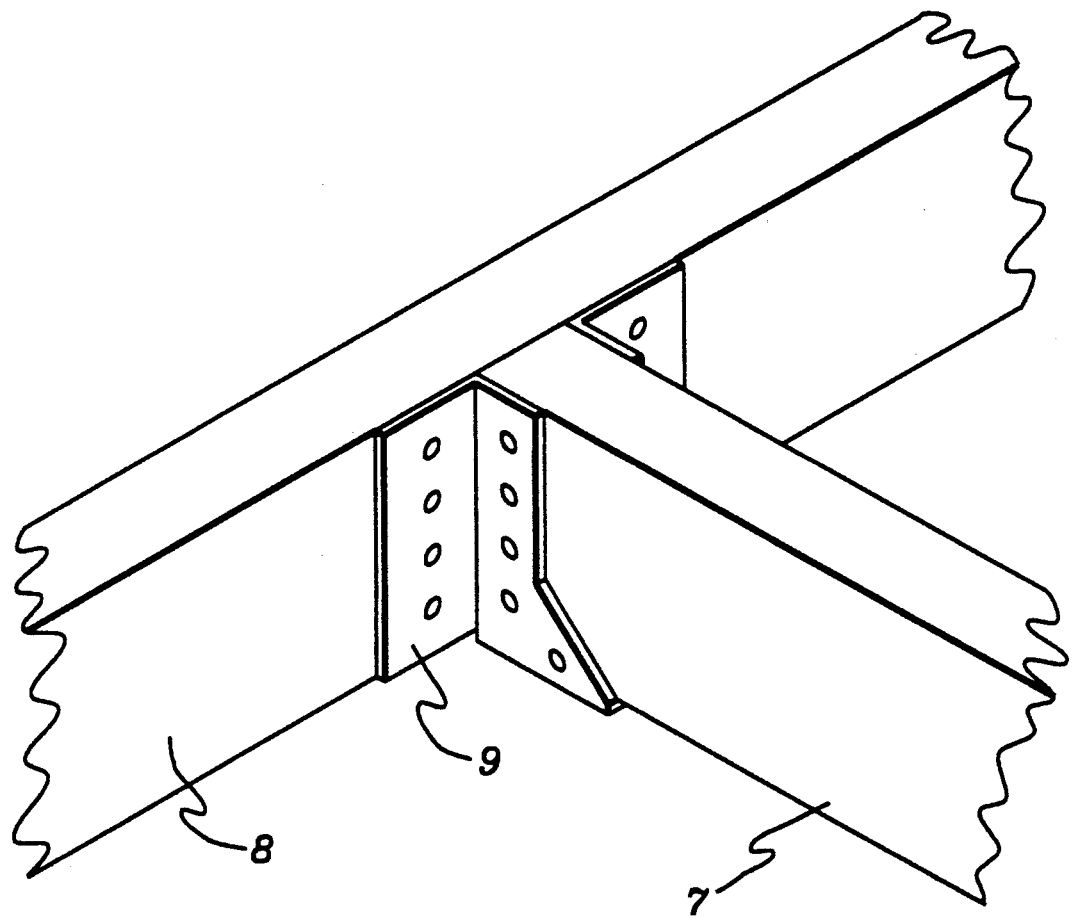
FIG. 1 is a depiction of a joint hanger currently in use.
Figure 2A:
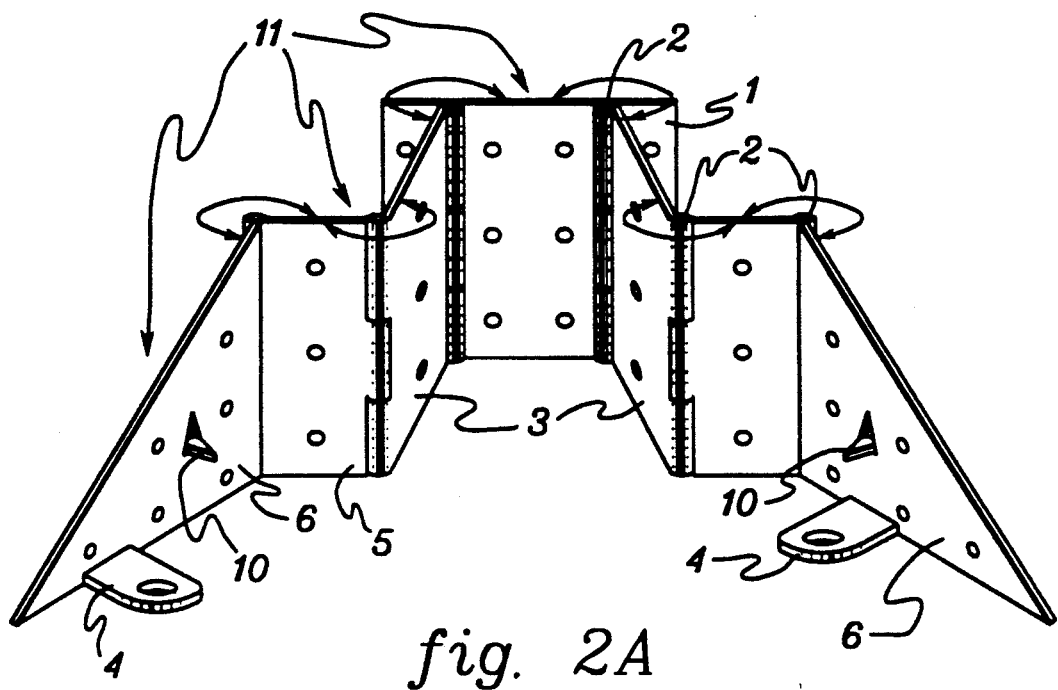
FIGS. 2a, 2b and 2c various versions of the invention herein.
Figure 2B:
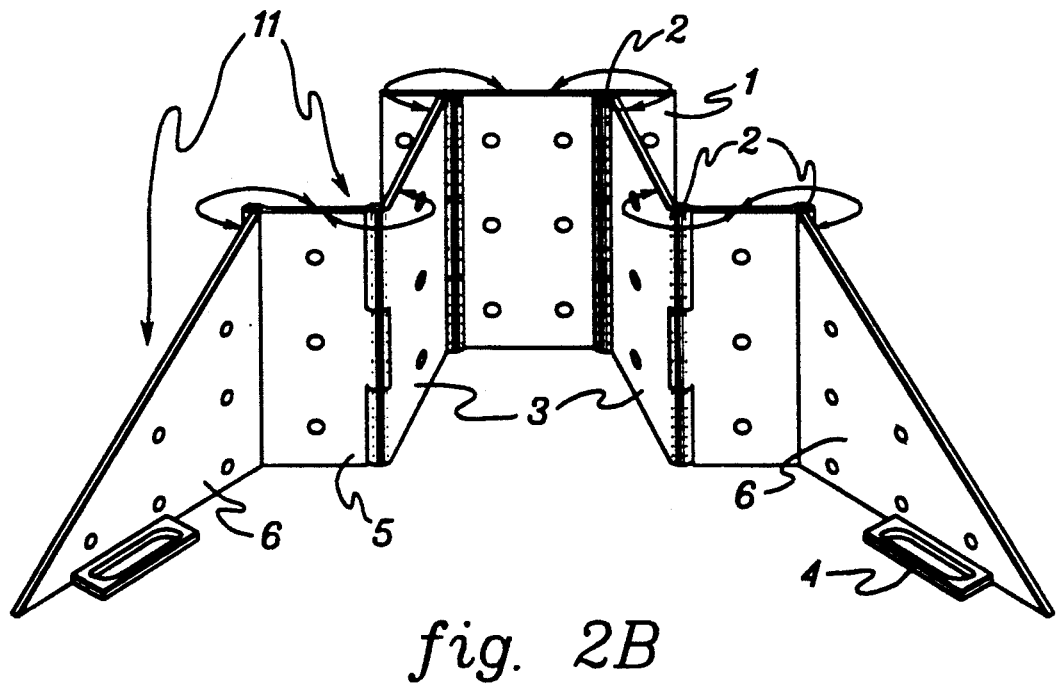

One version of the preferred embodiment of the variable angle hanger is depicted in FIGS. 2a and 2b. It consists of a base plate 1 to which is attached by hinge 2 a first support section 3. In addition attached to the first support section by a hinge 2 is a second support section 5 and in turn attached to the second support section 5 by hinge 2 is a third support section 6. The end support section as in the version set forth in FIGS. 2a and 2b can be cut at an angle as depicted to provide additional aid in attaching it to a joist. The hinge in this version being the means for flexibility attaching the support sections to the base plate.

Additionally to the support sections, in particular the end support section in this case the third support section 6, a flange 4 can be added to provide additional vertical support for the joist which is held by the flexible angle hanger.

Figure 3A:
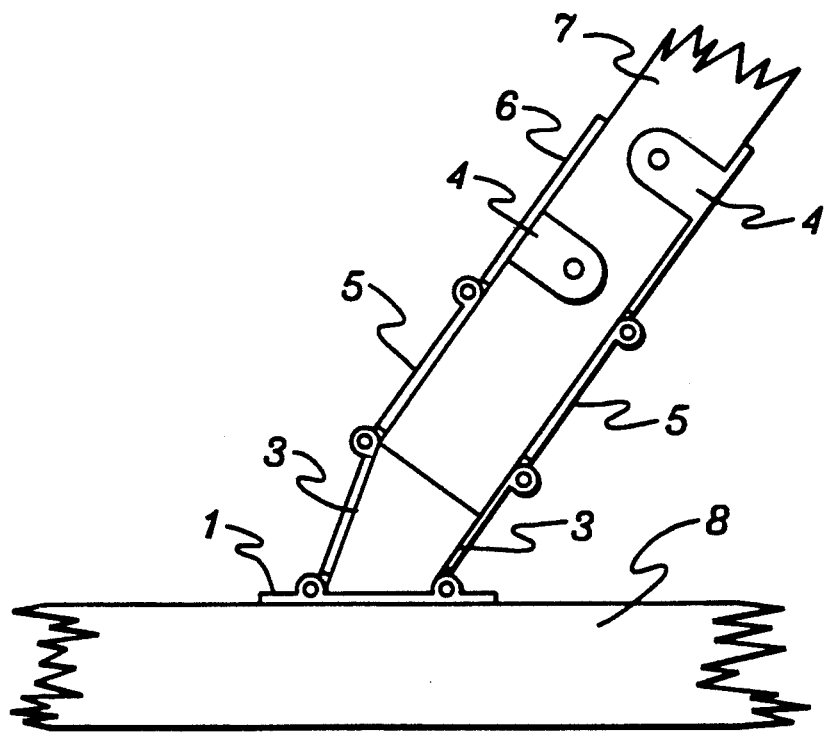
FIGS. 3a, 3b and 3c are depictions of one version of the invention herein, and supporting a joist at different interface angles attached to a beam.
Figure 3B:
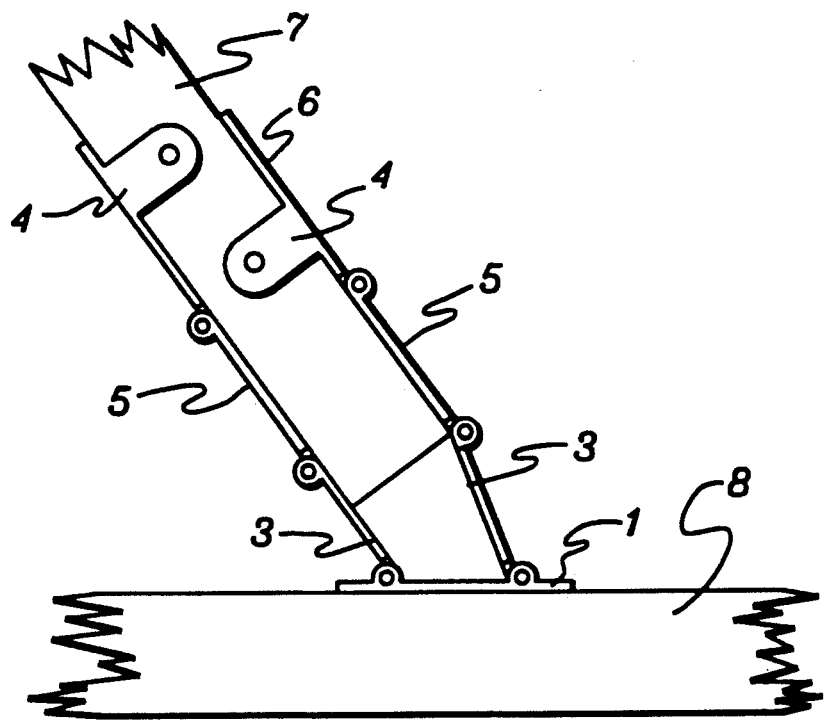
Figure 3C:
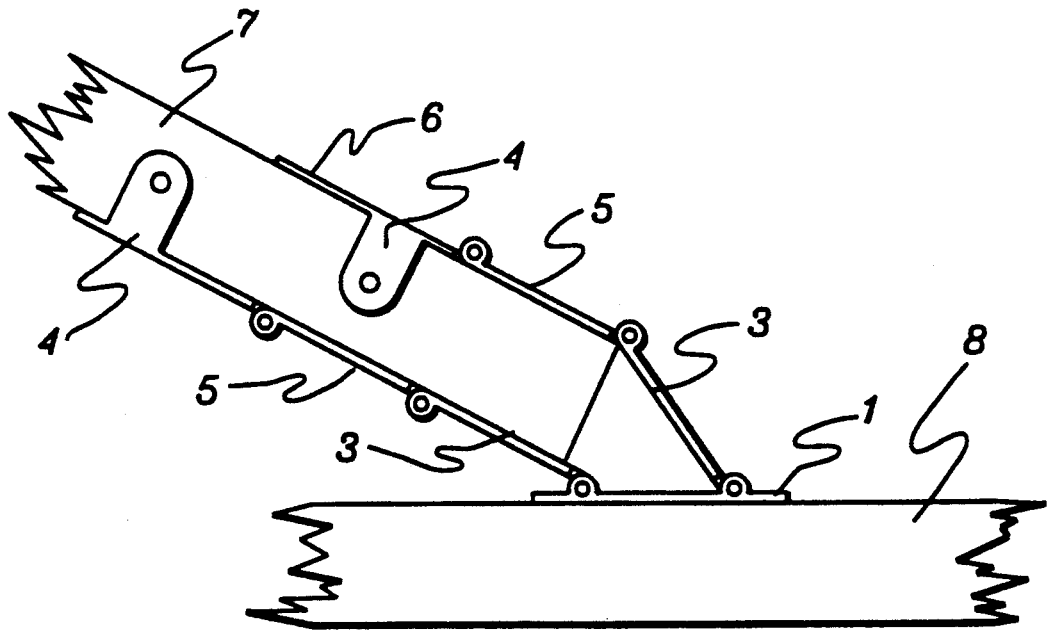

FIGS. 3a, 3b and 3c depict the angle hanger supporting a joist 7 at different interface angles. The angle hanger is first attached securely to a beam 8 as depicted in FIGS. 3a, 3b, and 3c. In the version shown there are holes in the base plate so that screws, nails or other attaching devices can be inserted through the base plate into the beam. Then a joist 7 is taken and the angle at which the joist is to meet the beam 8 is determined and the first support sections 3 are pivoted so that they are at the angle to which the joist will meet the beam. The second and third support sections 5 and 6 each support side are pivoted so that one or more of them fits flush along the respective side of the joist 7 it is to be permanently affixed to. The bottom of the joist then comes to rest on the two or more flanges 4 projecting from the support sections. Then devices to permanently affix the support sections to the sides of the joist can be inserted through the holes as the holes are depicted in the present embodiment. Such devices would either be screws or nails. However holes could be drilled through the joist and bolts could be inserted through the support sections and joist and permanently affixed. A further refinement could be the inclusion of spikes 10 projecting inward from the sides of the support section which when the support sections are pressed flush against the wood the spikes would become buried in the sides of the joist creating a firm contact.

Figure 2C:
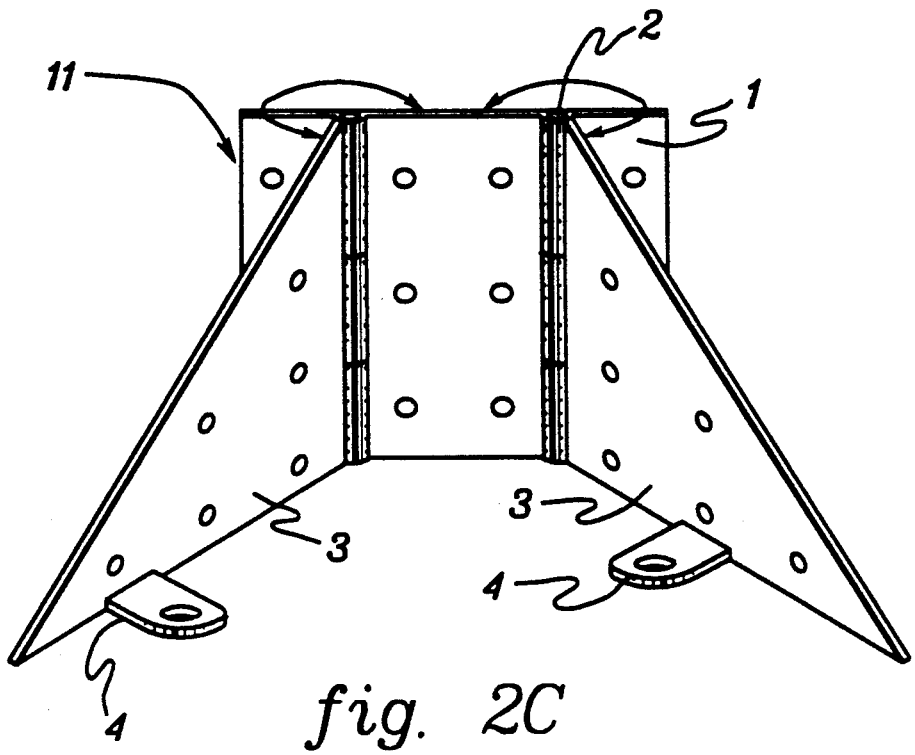

In the second version depicted in FIG. 2c, the flexible angle hanger, is composed of a base plate 1 and two support sides 3 attached by hinges 2 to the base plate. In this embodiment, the support sides are made up of a malleable material preferably aluminum or some other type of metal or strong material which will be pliable enough to be bent and form a flush fit with the side surfaces of the joist. The support sides 3, of this embodiment bent to form a flush fit with the side surfaces of the joist and the flanges 4 provide additional vertical support for the joist.

Obviously, another variation of the form of the flexible angle hanger, wherein the means for flexibility attaching the support sections to the base plate and each other is by hinges, could have just one additional support section hingedly attached to each of the first support sections attached to the base plate. In this version, the second support sections would be attached to the joist and have the supporting flanges.

Figure 4A:
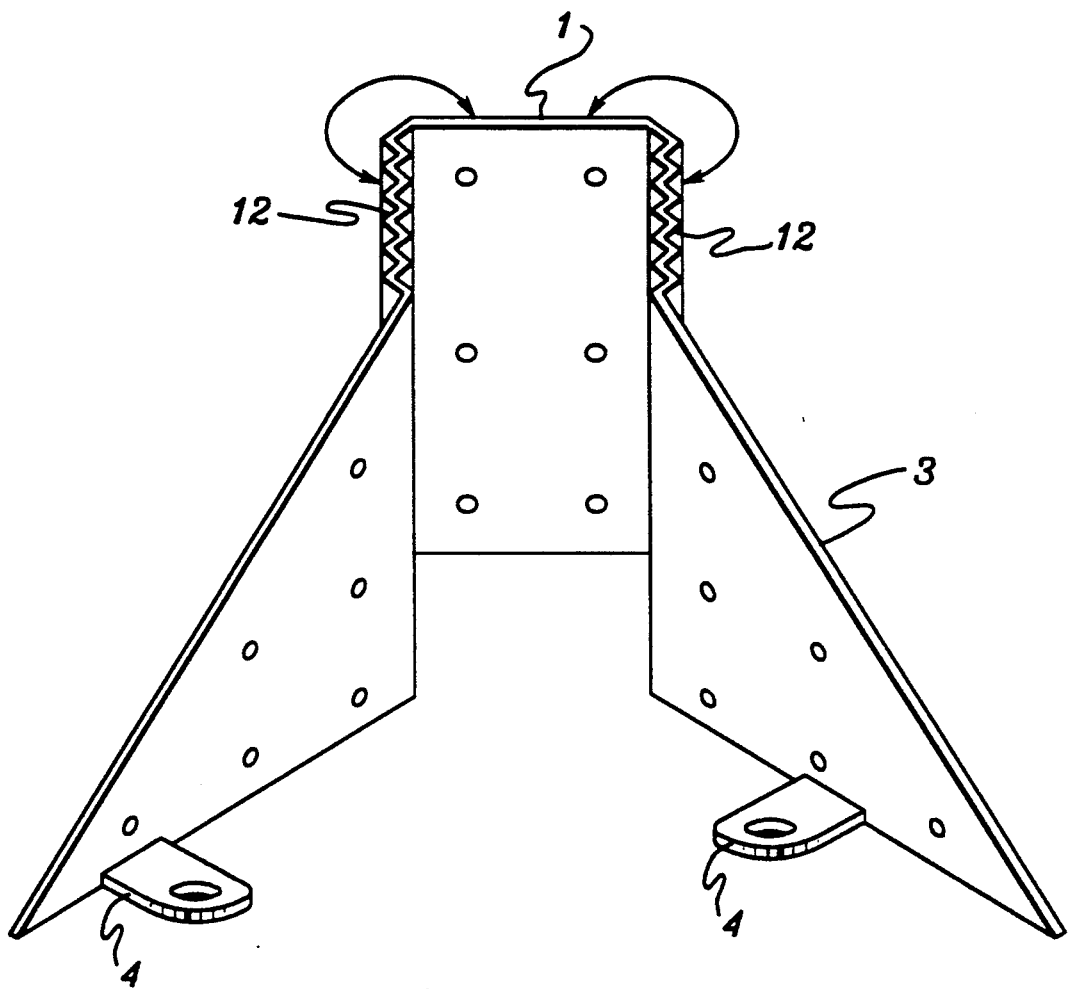
FIGS. 4a, 4b and 4c are depictions of the invention with the accordion or multi-folded structure.
Figure 4B:
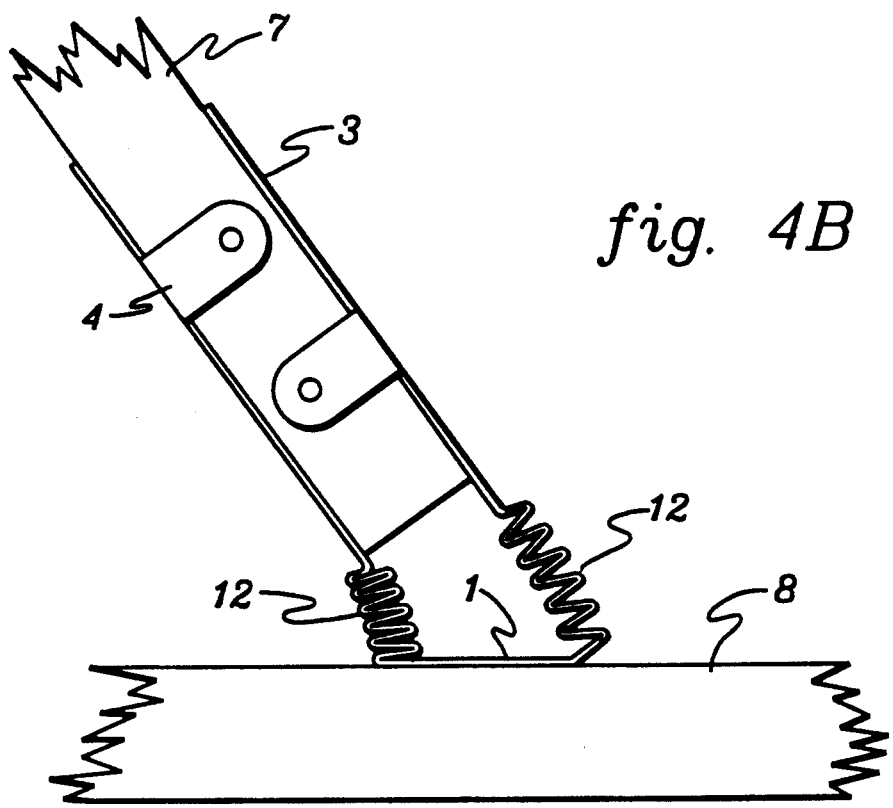
Figure 4C:
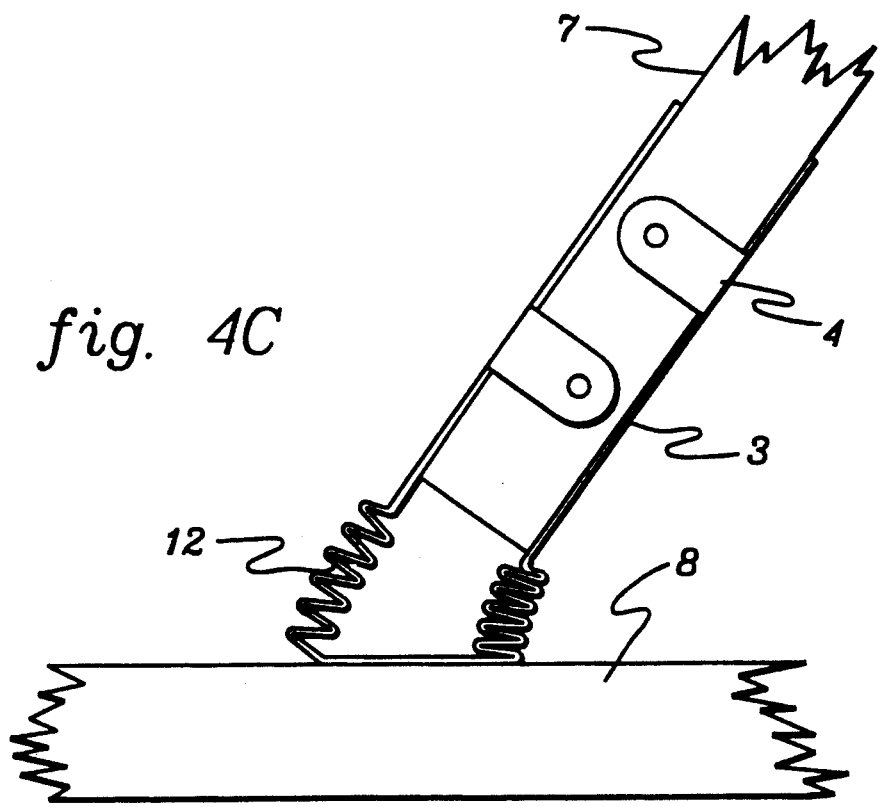

In the third version of the Variable Angle Hanger depicted in FIGS. 4a, 4b and 4c, the means for flexibility attaching the support sides 3 to the base plate 1 would be a multi-folded section 12 or in different words, a malleable accordion shaped section 12. The multi-folded section 12 would generally be a pliable or ductile metal or material with similar qualities. In fact, in the manufacturing process the malleable accordion shaped section 112, the base plate 1, and the support sides 3 would probably be made from one piece of metal or other material which would be malleable and pliable but also have the necessary strength, durability and stiffness to provide the required support and holding capabilities. As can be seen in FIGS. 4b and 4c because of the flexibility of the malleable accordion shaped sections 12, the support sections 3 can be maneuvered and manipulated so they can be adjusted for the correct angle of interface between the joist 7 and beam 8. Additionally, because of the multifolded structure of the malleable accordion shaped section 12, the sections 12 can be collapsed as shown in FIGS. 4b and 4c as well as bent to the correct angle providing greater flexibility to the flexible angle hanger. A plurality of holes can be made in the support sections 3 and base plate 1 through which securing devices such as nails or screws can be inserted.

As an alternative, to provide support and bonding between the support sections and joist, a plurality of spikes or spike like structures facing in towards the opposite support sections could be added. The spike like structures being perpendicular to the inter face of the support section. When the joist is placed between the support sections for final attachment the spike like structures can be driven into the joist and provide a firm bond between the support section and joist. The most useful lengths for the spike like structures would be from $\frac{1}{8}$" to $\frac{3}{4}$" of an inch but they could be longer or shorter depending on the needs. The spike like structures could be made from the support section itself by perforating the support sections from their outside surface in the form of a spike and then bending this inwards, leaving the spike shaped form attached to the support section at its base, until the spike shaped form is at right angles to the inside face of the support section.

What is claimed is:

1. A variable angle joist support comprising:
   a base plate for flush mounting to a first surface of a beam;
   a pair of spaced apart support sides for sandwiching therebetween a joist to be supported at a variable interface angle to said beam, said interface angle being formed between a support side and said base plate, each support side including a plurality of hinged support sections of which at least one is positionable to fit flush against a respective side surface of said joist; and
   hinge means for flexibly attaching the support sides to the base plate along parallel inner edges of said sides such that when the base plate is mounted to the first surface of the beam, the support sides are pivotable at said attachment means to receive the joist at an interface angle which can vary from acute to obtuse.

2. A variable angle joist support as in claim 1 wherein the means for flexibility attaching each side comprises a hinge.

3. A variable angle joist support as in 1 wherein the support sides are made of a malleable material which can be shaped to fit around an end of the joist.

4. A variable angle joist support as in claim 1 wherein at least one of the support sides has one or more flanges projecting from a bottom of the support side towards the opposite support side so that when the support sides sandwich a joist the flanges provide support to a bottom surface of the joist.

5. A variable angle support as in claim 4 wherein each of said support sides includes one or more of said flanges, all of said flanges are coplanar and each flange includes means to accommodate securing of the flange to the bottom surface of the joist.

6. A variable angle support as in claim 5 wherein the means to accommodate securing of the flange comprises an aperture extending through the flange.

7. A variable angle support as in claim 6 wherein the base plate includes a plurality of apertures therethrough, and each support side includes a plurality of apertures therethrough.

8. A variable angle support as in claim 1 wherein one or more of the support sections have a plurality of holes through which securing devices can be inserted to securely hold a joist placed between the support sides.

9. A variable angle support as in claim 1 wherein each support side comprises three support sections: a first support section attached to the base plate, a second support section attached to an end of the first support section and a third support section attached to an end of the second support section.

10. A variable angle support as in claim 9 wherein the third support section is shaped in the form of a triangle.

11. A variable angle support as in claim 9 wherein the third support section have a plurality of spike like structures on an inside face thereof.

* * * * *